United States Patent
Ramanathan et al.

(10) Patent No.: US 11,048,973 B1
(45) Date of Patent: Jun. 29, 2021

(54) ACTION CLASSIFICATION USING AGGREGATED BACKGROUND SUBTRACTION IMAGES

(71) Applicant: ObjectVideo Labs, LLC, Tysons, VA (US)

(72) Inventors: Narayanan Ramanathan, Chantilly, VA (US); Achyut Boggaram, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 126 days.

(21) Appl. No.: 16/525,939

(22) Filed: Jul. 30, 2019

Related U.S. Application Data

(60) Provisional application No. 62/712,687, filed on Jul. 31, 2018.

(51) Int. Cl.
*G06K 9/62* (2006.01)
*G06K 9/00* (2006.01)

(52) U.S. Cl.
CPC ........ *G06K 9/6256* (2013.01); *G06K 9/00711* (2013.01); *G06K 9/6267* (2013.01)

(58) Field of Classification Search
CPC . G06K 9/6256; G06K 9/6267; G06K 9/00711
See application file for complete search history.

(56) References Cited

U.S. PATENT DOCUMENTS

| 7,068,842 | B2 | 6/2006 | Liang et al. |
| 7,742,650 | B2 | 6/2010 | Xu et al. |
| 2010/0011297 | A1* | 1/2010 | Tsai ...................... G06F 16/743 715/721 |
| 2019/0221090 | A1* | 7/2019 | Beiser .................. G06K 9/6274 |
| 2020/0285670 | A1* | 9/2020 | Sharma ............... G06F 16/5866 |

* cited by examiner

*Primary Examiner* — Leon Viet Q Nguyen
(74) *Attorney, Agent, or Firm* — Fish & Richardson P.C.

(57) ABSTRACT

Methods, systems, and apparatus, including computer programs encoded on a computer storage medium, for classifying actions of an object. The methods, systems, and apparatus include actions of: obtaining frames of video including an object of interest; determining a type of action of the object in each of the frames of video; determining a group of frames from the frames of video based on the type of action; determining an aggregated background subtraction (ABS) image based on adjacent frames of the group of frames; generating a training set that includes labeled ABS images including the ABS image; and training an action classifier using the training set.

23 Claims, 5 Drawing Sheets

ACTION CLASSIFICATION USING AGGREGATED BACKGROUND SUBTRACTION IMAGES

CROSS REFERENCE TO RELATED APPLICATIONS

This application claims benefit of U.S. Provisional Application No. 62/712,687, filed on Jul. 31, 2018, titled "Action Classification Using Aggregated Background Subtraction Images," which is incorporated by reference in its entirety.

TECHNICAL FIELD

This disclosure application relates generally to monitoring systems, and more particularly, to classifying actions by an object.

SUMMARY

Techniques are described for training an action classifier. Real-time action classification may be of high importance in many video surveillance applications. Time critical events such as an unauthorized individual or vehicle entering a secure facility, unknown individuals loitering in home neighborhoods, a child entering a swimming pool in the absence of adult supervision, and a child running at a swimming pool area, may each demand instant notification to a user. Deep learning driven object detection solutions may be extremely accurate in detecting objects and classifying actions by such objects. For example, the deep learning driven solutions may provide classification of actions by a human based on tracking locations of joints of the human captured in frames of video. However, such classification solutions may be computationally intensive and, as a result, need continuous access to powerful graphical processing unit (GPU) cards to operate in real-time. Such a requirement may increase the cost associated with surveillance applications and render the application out of reach for most consumers from a price standpoint. In addition, latency in event notifications may be unavoidable when such GPU based object detection algorithms are run on remote servers or on the cloud.

An action classification system may include a light-weight action classifier that includes a neural network trained to classify actions by an object based on aggregated background subtraction (ABS) images of the object captured in frames of video. An object of interest may be a type of object that is to be monitored by the system, e.g., humans, vehicles, pets, etc. An ABS image is a summation of absolute inter-frame differences between adjacent frames of video of the object of interest. The ABS image may include information about an object which is in motion, and most actions are results of the moving objects. Using the ABS images, the need to unlearn the background objects may be eliminated for a particular action classification task. The ABS image may include information that excludes backgrounds or portions, which are unlikely related to an action by the object of interest, from a process for classifying action by an object in frames of video. Accordingly, the light-weight action classifier, which processes ABS images rather than individual frames of video, may enable a real-time action classification using less processing power than other classification techniques that analyze individual frames of video. The light-weight action classifier may also provide improvement in problems with sensitivity to illumination changes, inclement weather conditions, or constantly moving insignificant objects within scenes such as trees, insects, and debris.

In some implementations, the action classification system may include a heavy-weight action classifier that analyzes individual frames of video based on a deep learning driven object detection technique. For instance, the heavy-weight action classifier may extract a distinguishable feature (e.g., joint angles, dynamics of joint locations, and relative positions of body parts) of an object captured in frames of video and annotate each frame with a type of action to build a training dataset of ABS images for a light-weight action classifier.

According to one aspect of the subject matter described in this application, a computer-implemented method includes: obtaining frames of video including an object of interest; determining a type of action of the object in each of the frames of video; determining a group of frames from the frames of video based on the type of action; determining an ABS image based on adjacent frames of the group of frames; generating a training set that includes labeled ABS images including the ABS image; and training an action classifier using the training set.

Implementations according to this aspect may include one or more of the following features. For example, determining the ABS image may include determining a first value of a pixel at a particular coordinate in a first frame among the group of frames; determining a second value of a pixel at the particular coordinate in a second frame adjacent to the first frame among the group of frames; obtaining an absolute value corresponding to a difference between the first value and the second value; aggregating the absolute value with one or more absolute values obtained for the particular coordinate from other pairs of frames among the group of frames; and based on the aggregation, determining a resulting value corresponding to a pixel in the ABS image that corresponds to the particular coordinate.

In some implementations, the method may include: obtaining sample frames of video including a sample object; determining a sample ABS image based on two or more of the sample frames of video; processing the sample ABS image through the action classifier; and determining a type of action corresponding to the sample object among the one or more types of actions based on an output of the action classifier. In some examples, determining the type of action corresponding to the sample object based on an output of the action classifier may include: receiving from the action classifier an indication of a likely action corresponding to the sample ABS image and a confidence score corresponding to the likely action; determining whether the confidence score satisfies classification criteria; and based on a determination that the confidence score satisfies the classification criteria, determining that the likely action corresponds to the type of action among the one or more types of actions.

In some implementations, the method may include: determining a first number of frames corresponding to the sample ABS image; comparing the confidence score to a threshold confidence score included in the classification criteria; and based on a result of the comparison, determining whether the first number of frames was a threshold number of frames that satisfies the classification criteria. In some examples, the method may include: based on a determination that the first number of frames was not the threshold number of frames that satisfies the classification criteria, determining a subsequent sample ABS image from a second number of frames that is different from the first number of frames; and providing the subsequent sample ABS image to the action classifier.

In some implementations, processing the sample ABS image through the action classifier may include processing a plurality of sample ABS images determined from different numbers of sample frames of video. In such implementations, the method may include: determining a likely action corresponding to each of the plurality of sample ABS images and a confidence score corresponding to each likely action; comparing each confidence score to a threshold confidence score; and based on results of the comparison, determining one number of frames among the numbers of frames as a threshold number of frames for generating a subsequent ABS image.

In some implementations, determining the type of action of the object in each of the frames of video may include processing each of the frames of video through a heavy-weight action classifier that has a processing power greater than a processing power of the action classifier. In some examples, processing each of the frames of video through the heavy-weight action classifier may include: determining locations of joints of the object with respect to a reference coordinate system; and determining the type of action of the object based on movement of the locations of the joints of the object.

In some implementations, the method may include: determining a label corresponding to the group of frames based on the type of action that was determined; and including the ABS image in the labeled ABS images labeled with the determined label.

In some implementations, training the action classifier may include: processing the training set through operation layers of the action classifier, where the operation layers include one or more parameters configured to classify the labeled ABS images to one or more types of actions; and based on classification results from the processing of the training set through the operation layers, updating the one or more parameters of the operation layers of the action classifier.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Techniques are described for training an event detector.

Figure 1:
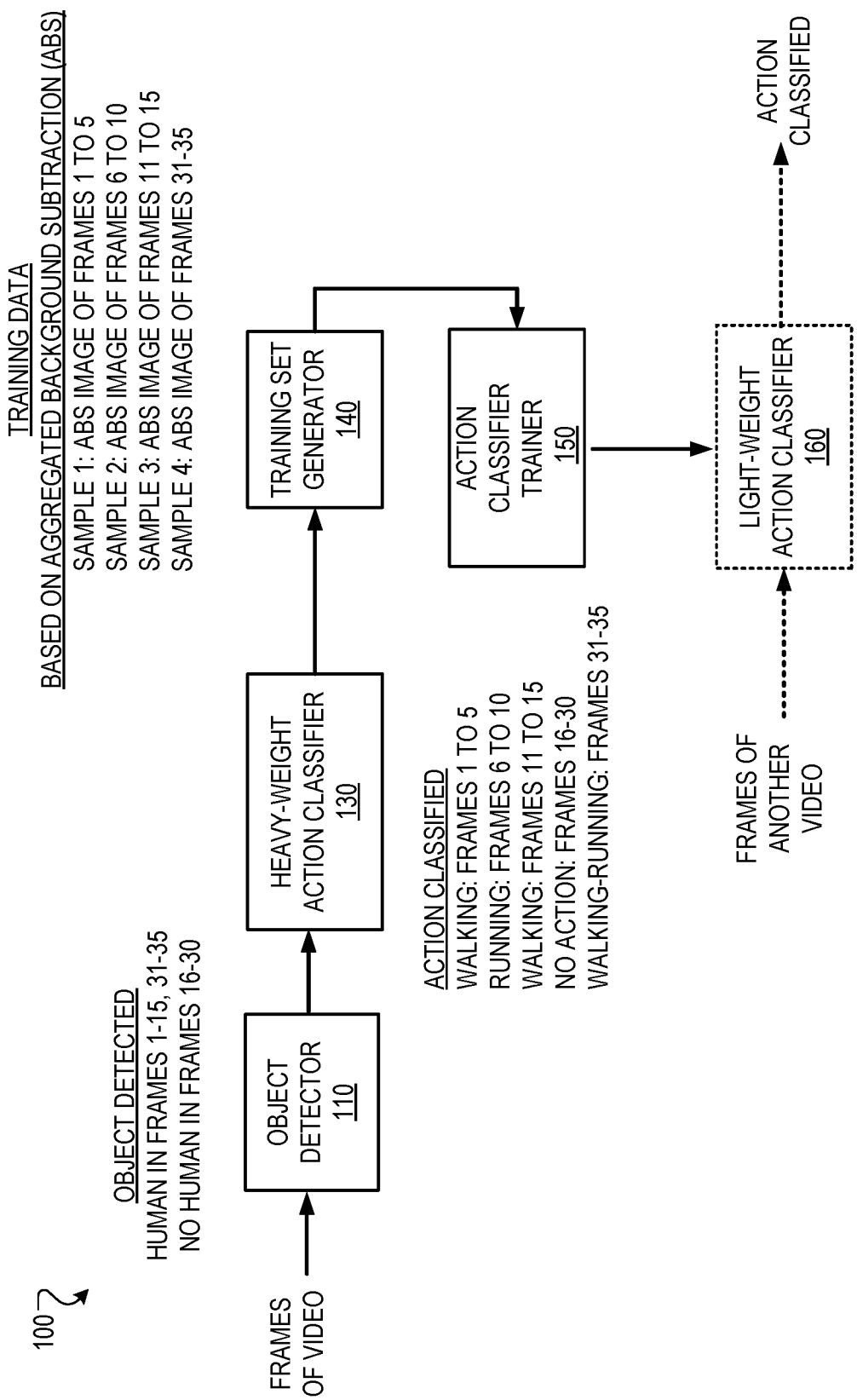
FIG. 1 illustrates an example block diagram of a system for training an action classifier.

FIG. 1 illustrates an example block diagram of a system 100 for training an action classifier. The system 100 includes an object detector 110 that detects objects of interest in frames of video, a heavy-weight action classifier 130 that determines types of actions by an object of interest detected in the frames, a training set generator 140 that generates a training set of ABS images based on the determined types of actions, and an action classifier trainer 150 that trains a light-weight action classifier 160. The trained light-weight action classifier 160 may then obtain frames of another video, determine ABS images corresponding to the frames of the other video, and determine a likely action corresponding to the ABS images. A likely action is what the light-weight action classifier 160 predicts as a type of action by the object. Detailed descriptions about an ABS image will be provided below with regard to FIG. 2.

The trained light-weight action classifier 160 may, one or more of, use less processing power or process faster than the object detector 110 and the heavy-weight action classifier 130. Accordingly, processing power may be reduced or processing speed may be increased by using the trained light-weight action classifier 160 on ABS images generated from frames of video instead of using the object detector 110 and the heavy-weight action classifier 130 on the individual frames of video. In an example, a camera may have enough processing power to use a light-weight action classifier but not enough processing power to use a heavy-weight action classifier.

The object detector 110 may detect objects of interest in frames of video. For example, the object detector 110 may obtain consecutive frames of a video of a front door and determine that in Frames 1-15 a human is detected and in Frames 16-30 a human is not detected. The object detector 110 may detect objects of interest based on the pixels within a single frame of video. For example, the object detector 110 may detect a human in a single frame of video based on determining that the pixels in the single frame show a shape that matches a shape of a human. In another example, the object detector 110 may detect a human in a single frame of video based on determining that the pixels in the single frame include features corresponding to a human object. The object detector 110 may output a label for each frame that indicates whether an object of interest was detected in the frame. For example, the object detector 110 may output labels of "Human detected" for Frames 1-15 and 31-35, and "No human detected" for Frames 16-30. In some implementations, the labels may be a binary value where a first value indicates "No human detected" and a second different value indicates "Human detected."

In some implementations, the system 100 may transmit from the object detector 110 only frames that are labeled as including an object of interest to reduce processing power for subsequent processes. For example, when the system 100 is training an action classifier for classifying actions of human, the system 100 may transmit, to the heavy-weight action classifier 130, only frames that include a human, and discard frames that include an animal or some other object based on detection by the object detector 110.

In some implementations, the object detector 110 may be provided as an optional component of the system 100. In such cases, a subsequent component such as the heavy-weight action classifier 130 or the training set generator 140 are configured to process only frames that include an object of interest. For example, the heavy-weight action classifier 130 may be configured to detect joints of human from frames of video and to ignore other objects of no importance. In another, the training set generator 140 may be configured to exclude an object of no importance from an ABS image, for example, by a masking technique that zeros out regions of the ABS image that are not of importance. In some implementations, the heavy-weight action classifier 130 may correspond to an object classifier that includes an engineered geometric rule-based system. In this case, the object classifier may determine action type labels of the object of interest detected in the frames of video.

The heavy-weight action classifier 130 may detect locations of parts of the object in frames of video using a deep learning based technique. For example, the heavy-weight action classifier 130 may determine locations of joints of human (e.g., neck, elbows, waist, knees, ankles, etc.) and associate the determine locations of joints to a coordinate system corresponding to the frames of video. Further, the heavy-weight action classifier 130 may determine angles at the joints between body parts (e.g., head, back, arms, legs, upper torso, hip, etc.) of human in the frames of video. The heavy-weight action classifier 130 may then determine a type of action corresponding to each of the frames based on one or more of the locations of the joints, the angles of the joints, and changes of the angles and locations of the joints. For example, the heavy-weight action classifier 130 may determine types of actions corresponding to Frames 1-5, Frames 6-10, and Frames 11-15 as Walking, Running, and Walking, respectively, based on changes of angles at elbows and knees of the human detected in the respective frames.

In some implementations, the heavy-weight action classifier 130 includes preset rules on changes in joint angles to identify human actions detected in consecutive frames and automatically annotate each frame with a type of action. The preset rules may be a relationship between a type of action and changes in joint angles. For instance, changes in angles at the elbows and knees locations are 10%, 20%, 50%, or some other percentage more pronounced during running than during walking. In another, the learned rules may include information regarding an angle between an upper torso and hip, which changes more drastically during bending than during walking or running.

In some implementations, the heavy-weight action classifier 130 includes a human joint locator that is configured to determine a location of a human joint, a joint angle estimator that is configured to estimate an angle defined by the human joint, and a support vector machine (SVM) or a random forest classifier that is trained to identify actions of a human based on the location of the human joint and the estimated joint angle. In some examples, the heavy-weight action classifier may use one or more human objects as ground truth for action classification.

In some implementations, the heavy-weight action classifier 130 outputs a label for frames in which no action was detected. For example, if Frames 16-30 in which no action is detected may be substantially identical to each other (e.g., locations and angles of joints of human are the same in adjacent frames), the heavy-weight action classifier 130 may output No Action label for Frames 16-30.

In some implementations, the heavy-weight action classifier 130 may determine that frames of video include multiple objects of interest, and classify actions by the multiple objects of interest. For example, the heavy-weight action classifier 130 may determine presence of multiple objects of interest based on a number of certain parts of the objects (e.g., heads) included in the frame. The heavy-weight action classifier 130 may further determine types of actions by the multiple objects of interest by tracking locations or angles of the certain parts of each object as described above for a single object. In some implementations, the heavy-weight action classifier 130 may output a label of "Walking-Running" for Frames 31-35 to indicate that one object is determined as "Walking" and the other object is determined as "Running." In other examples where the system monitors actions at a swimming pool, the heavy-weight action classifier 130 may output a label of "Walking-Diving" to indicate that one object is determined as "Walking" and the other object is determined as "Diving" into the swimming pool.

The training set generator 140 may generate a training set based on the determinations by the heavy-weight action classifier 130 on a type of action by an object of interest for each frame. The training set may include one or more samples that are each generated from a group of frames that have been determined to have the same type of action by the heavy-weight action classifier 130. For example, the training set generator 140 determines one or more groups of consecutive frames according to the types of actions determined by the heavy-weight action classifier 130. In detail, the training set generator 140 may determine a first group of Frames 1-5, a second group of Frames 6-10, a third group of Frames 11-15, and a fourth group of Frames 31-35 according to their types of actions.

The training set generator 140 may then generate a training sample corresponding to each group that has been determined based on the type of action. For example, the training set generator 140 may generate Sample 1, Sample 2, Sample 3, and Sample 4, each of which includes one or more ABS images of the frames that are grouped based on the type of action. For example, Sample 1 may include a first ABS image generated from Frames 1-3 and a second ABS image generated from Frames 1-5. In the example shown in FIG. 1, Sample 1 may be an ABS image that represents a Walking action, and Sample 2 may be an ABS image that represents a Running action. Similarly, Sample 3 may be an ABS image that represents another Walking action, and Sample 4 may be an ABS image that represents a Walking-Running action of multiple objects of interest. In examples when multiple actions by multiple objects correspond to the same type of action (e.g., walking), the frames may be grouped to an existing action type (e.g. "Walking") action instead of a new action type (e.g., "Walking-Walking").

The training set generator 140 may annotate each sample with the corresponding type of action based on the labels of the frames. For examples, the training set generator 140 may annotate Samples 1 and 3 with "Walking," Sample 2 with "Running," and Sample 4 with "Walking-Running" based on the labels of the frames that have been determined by the heavy-weight action classifier 130. In some cases, the labels of the samples may be different from the labels of the frames. For example, Sample 1 may be labeled as "H-W" to indicate a walking action sample of a human.

In some implementations, the training set generator 140 may segment a frame if multiple objects of interest are detected in the frame instead of determining a combined action type that indicates the multiple types of actions. For example, frames of video may include a first portion where a first object of interest performs a walking action, and a second portion where a second object of interest performs a running action. In this example, the training set generator 140 may segment the frames into the first portion and the second portion to generate a separate ABS image for each portion. In some implementations, the training set generator 140 may determine a type of action that indicates whether the multiple objects of interest are interacting with each other. For example, the training set generator 140 may determine labels of "Interaction" and "No interaction" based on a determination whether portions of the multiple objects overlap between the multiple objects in an ABS image. Such labels may be provided in addition to a label for a type of action. For instance, Sample 4 may be labeled as "Walking-Running-Interaction" to indicate that multiple objects are walking and running, respectively, and interact with each other.

The training set generator 140 may generate the ABS images by subtracting adjacent frames and summating absolute inter-frame differences. For example, Sample 1 is an ABS image generated based on a summation of absolute inter-frame differences between Frames 1 and 2, Frames 2 and 3, Frames 3 and 4, and Frames 4 and 5. Each absolute inter-frame difference may be calculated by taking an absolute value of subtraction between pixel values of pixels at the same coordinates of adjacent frames. Accordingly, the training set generator 140 generates an ABS image by a pixel wise summation of absolute inter-frame differences. The ABS image may be a color image, a gray scale image, or a black-white image. Each pixel of the ABS image may include a single value or a vector of multiple values. In some implementations, the training set generator 140 may also identify regions in frames that are not important to classification of action by an object of interest, and mask out in the ABS images, e.g., zero out, regions that are not of importance. For example, a user may specify an area in images in which actions aren't to be classified and the training set generator 140 may in response generate an ABS image where those pixels in the area have a value of zero.

In some implementations, the training set generator 140 may generate ABS images that have different frame rates corresponding to types of actions, respectively. The training set generator 140 may include information regarding a distinguishability corresponding to a type of action based on the frame rates. For instance, the training set generator 140 may generate ABS images derived from five adjacent frames captured at twenty five frames per second (fps), which may be sufficient to train an action classifier to learn a running action. The training set generator 140 may generate an ABS image from 5 frames captured at a lower frame rate (e.g., five fps), which may be sufficient to train the action classifier to learn a walking action. In some examples, adjacent frames at twenty five fps would create a good ABS signature for fast actions. For slower actions, the frame rate may need to be less than or equal to five fps.

In some implementation, the number of frames used to generate ABS images may be configurable. For example, five frames may suffice to generate an ABS corresponding to indoor actions which may occur in a relatively small range. For outdoor actions, which may occur in a relative large range, ten or more frames may be used to generate a distinguishable ABS image for such actions. In some examples, a wide angled outdoor scene may need ten or more frames to generate a distinguishable ABS image from an action in the wide angled outdoor scene.

The action classifier trainer 150 may obtain the training set generated by the training set generator 140 and train a light-weight action classifier 160 to classify actions by an object of interest. For example, the action classifier trainer 150 may obtain a training set that includes ABS images for Frames 1-5 and 11-15 as walking action samples, an ABS image for Frames 6-10 as a running action sample, and an ABS image for Frames 31-35 as a Walking-Running action sample. The action classifier trainer 150 may obtain additional ABS images corresponding to the same or other types of actions and generate the trained light-weight action classifier 160. In some cases, the action classifier trainer 150 may obtain one or more ABS images that represent no action by an object of interest or that includes regions masked out as not of importance. For instance, an ABS image representing no action may include a value (e.g., zero) less than a sensitivity level that is set by the action classifier trainer 150 as corresponding to a noise included in an ABS image. The action classifier trainer 150 may output a value of zero for the input pixels having a value less than the sensitivity level.

The action classifier trainer 150 may train a neural network (e.g., convolutional neural network) using the ABS images as the input to the neural network and the label as the desired output of the neural network for that particular input. The neural network that is trained may be a neural network that includes fewer parameters or layers than a deep neural network of a heavy-weight action classifier 130. For example, the light-weight action classifier 160 may include a shallow convolutional neural network (CNN) that includes fewer convolutional layers than the heavy-weight action classifier 130. In some examples, the convolutional layers of the light-weight action classifier 160 have fewer parameters to train than the convolutional layers of the heavy-weight action classifier 130.

In some implementations, the action classifier trainer 150 may obtain validation data that include labeled ABS images that can be used to validate whether the light-weight action classifier 160 is performing with sufficient accuracy. For example, the action classifier trainer 150 may determine that an action classifier that is being trained is only correctly classifying actions by an object of interest in 50% of the validation set and, in response, continue to train the action classifier using additional training data generated by additional video captured by a camera. In another example, the action classifier trainer 150 may determine that an action classifier that is being trained is correctly classifying actions by an object of interest in 98% of the validation set and, in response, determine that the action classifier is sufficiently trained.

The trained light-weight action classifier 160 may then receive frames of another video, generate ABS images from the frames, and determines likely actions by an object of interest based on the ABS images. For example, the trained light-weight action classifier 160 may obtain additional frames of video taken by the same camera that provided the frames of video used to train the action classifier and determine a likely action by an object of interest based on ABS images generated from the frames, where the determination is performed less than or within seconds of the additional frames of video being taken by the same camera.

In some implementations, the system 100 may be performed by a server that is remote to a camera that captures the frames of video, and the trained light-weight action classifier 160 may be transmitted to the camera so that the camera may then use the trained light-weight action classifier 160 to classify actions by an object of interest based on ABS images. The camera may then only store or transmit frames of video in which an action by an object of interest is detected, saving storage, bandwidth usage, and power usage by the camera. In some implementations, the camera may store the ABS images on which an action by an object of interest is determined. In some implementations, the camera may only store a representation of an action determined by the ABS images. For example, the camera may only store metadata that indicate a type of action by an object of interest and a time stamp corresponding to the action. In some cases, the camera may discard individual frames once that the light-weight action classifier 160 classifies ABS images corresponding to the frames with a certain level of confidence.

In some implementations, the system 100 may identify a video from another camera that provides a similar view and also use the trained light-weight action classifier 160 for that other camera. For example, the system 100 may determine that a camera height, size of objects, or type of scene shown by the other camera is similar to the camera for which the action classifier is trained and, in response, also transmit the trained light-weight action classifier 160 to the other camera.

In some implementations, the system 100 may classify multiple types of actions by an object of interest and may generate a respective trained action classifier that corresponds to each type of action or multiple types of actions by an object of interest. For example, the system 100 may use a first action classifier that only detects walking and running actions by humans to generate an action classifier that determines such likely actions by humans, a second action classifier that only detects bending and laying-down actions by humans to generate an action classifier that determines such likely actions by humans, etc. The multiple trained action classifiers may then process frames of video in parallel.

In some implementations, the system 100 may classify an action by two or more objects of interest that interact with each other. For example, a person may walk toward a property, arrive at the property, and push/pull a door (i.e., interact with the door), where the door appears in an ABS image based on movement of the door. In another example, a person may walk while pushing an object such as a lawnmower or pulling an object such a trash can. Other types of interactions may be detectable using an ABS image(s). For instance, an ABS image(s) may be used to determine an action corresponding to a package delivery in which the light-weight action classifier 160 may classify the ABS image(s) as an interaction between a box and a person who is walking with the box, reaching a property, turning, and walking without the box.

In some implementations, the light-weight action classifier 160 may include an object detector that detects whether frames of another video include an object of interest. For example, the light-weight action classifier 160 may determine to generate ABS images only from frames that include an object of interest. In some implementations, the light-weight action classifier 160 may perform classification on ABS images without a separate object detector like the object detector 110 that performs an object detection process described above. For example, the light-weight action classifier 160 may generate an ABS image every preset number of frames that has been optimized for accuracy and speed of action classification. If the light-weight action classifier 160 does not identify a type of action that matches trained types of actions, the light-weight action classifier 160 may go on to a next ABS image. Accordingly, the light-weight action classifier 160 may reduce processing power for a separate object detection process by performing classification regardless of detection of an object in each frame.

Figure 2:
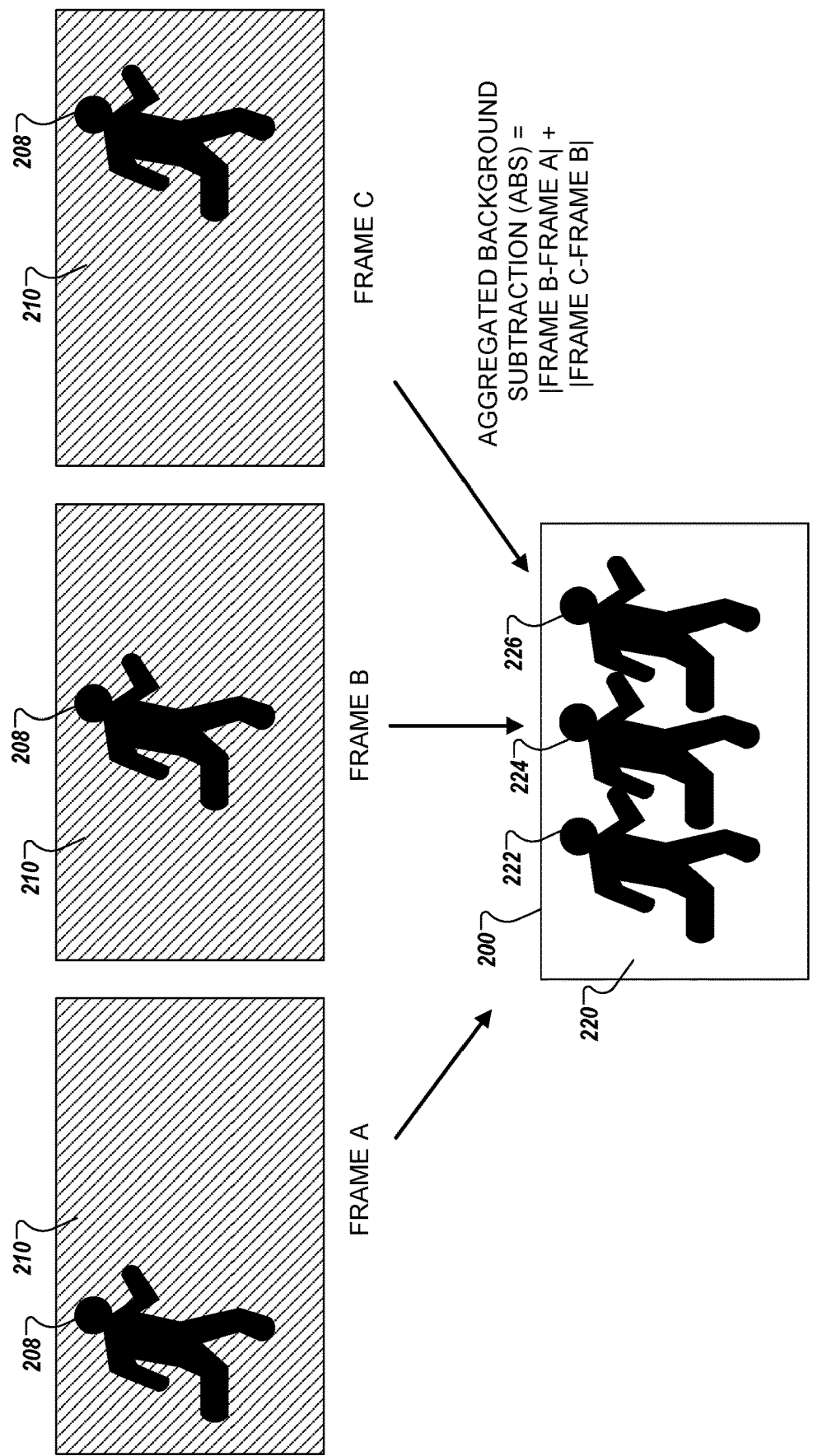
FIG. 2 illustrates an example of generating an aggregated background subtraction image.

FIG. 2 illustrates an example of generating an aggregated background subtraction (ABS) image 200 using frames of video. For example, Frame A, Frame B, and Frame C are consecutive frames of video that each include an object of interest 208 (e.g., human) and a background 210 at a particular time. The changes of locations of the object of interest 208 from Frame A to Frame C indicates an action (e.g., walking, running, etc.) by the object of interest 208 in the background 210. The ABS image 200 may include replications 222, 224, and 226 of the object of interest 208 and an aggregated background 220.

The ABS image 200 may be determined by a summation of absolute values of inter-frame differences of adjacent frames using an equation $$\sum_{i=1}^{N-1} |Frame_{i+1} - Frame_i|,$$

where i is a sequence number and N is a total number of frames to generate an ABS image. For example, the ABS image 200 may be calculated by |Frame B−Frame A|+|Frame C−Frame B| for each pixel of three Frames A to C. As one example, when pixel values at coordinates (3,4) are 255, 240, and 100 in Frames A, B, and C, respectively, a resulting pixel value at coordinates (3,4) in the ABS image 200 is |240−255|+|100−240|=155. The subtractions between adjacent frames (e.g., Frames A and B, Frames B and C) may zero out some portions (e.g., background 210) of the frames that are common to each frame, and leave other portions (e.g., replications 222, 224, 226) that change over the adjacent frames resulting in positive or negative pixel values.

The pixels corresponding to the background 220 of the ABS image 200 may have minimal values (e.g., zeros) that are less than a sensitivity threshold of an action classifier. For example, pixels of the ABS image 200 having a pixel value less than 10 or some other value may be set to zero. This may provide improvement in problems with sensitivity to illumination changes, inclement weather conditions, or constantly moving insignificant objects within scenes such as trees, insects, and debris. In addition, as the ABS image 200 may include pixels of zero values for static scene elements (e.g., trees, walls, doors, parked vehicles), the light-weight action classifier 160 may use less processing power to determine an action corresponding to the ABS image 200 than the heavy-weight action classifier 130 that classifies individual frames of video.

In some implementations, the pixels of the ABS image 200 may have a maximum value set as a saturation threshold of an action classifier. For example, the summation of absolute values of multiple pairs of inter-frame differences may result in an increase of a pixel value of a pixel. In some examples, the pixels of the ABS image 200 calculated to have a pixel value greater than a saturation threshold may be set to have the saturation threshold. In some implementations, the pixels of the ABS image 200 may not be limited by a saturation threshold and be used as is if the light-weight action classifier 160 has been trained to classify such ABS images regardless of a saturation threshold. In some cases, the pixel values of the ABS image 200 may be normalized, for example, between a range of zero to one. In some cases, the pixel values of the ABS image 200 may be determined with binary values, for example, one and zero.

In some implementations, the ABS image 200 may be generated from one or more color layers of frames of video. In some examples, Frames A-C are each the same color layers selected from red, green, blue (RGB) color layers of consecutive frames of video. In another, the ABS image 200 may include a vector (e.g., (255, 0, 0)) of pixel values for each pixel to represent multiple color layers of frames of video. In some implementations, the ABS image 200 may be generated from frames of video regardless of a color layer of frame. For example, Frames A-C may be obtained from an infrared (IR) camera or a thermal camera that outputs an intensity value for each pixel without layers of colors. In such examples, the ABS image 200 may include absolute values of inter-frame differences of the intensity values of respective pixels of the frames.

Figure 3:
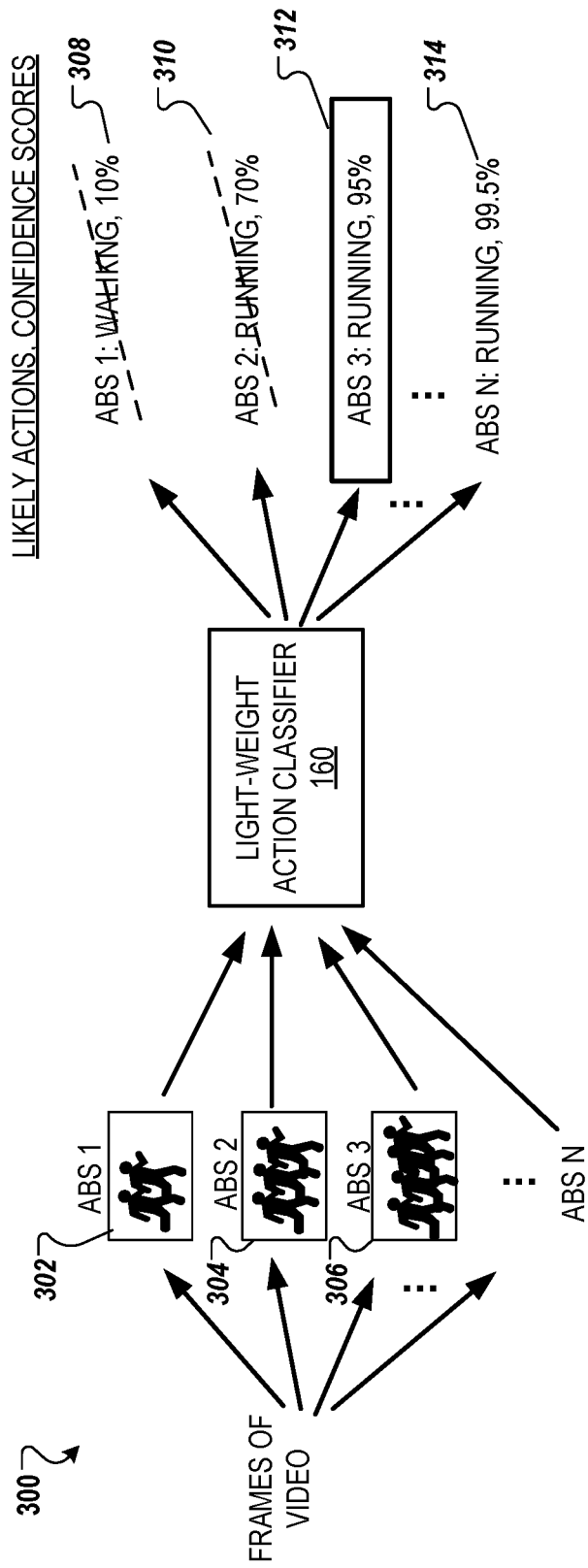
FIG. 3 illustrates an example black diagram of determining a likely action using a trained light-weight action classifier.

FIG. 3 illustrates an example block diagram of determining a likely action using a light-weight action classifier. The system 300 may include a trained light-weight action classifier 160 that obtains ABS images 302, 304, 306 as the input and that generates an output 308, 310, 312, 314 that indicate likely actions and confidence scores corresponding to the respective outputs. In some implementations, the system 300 may include an input generator that determines the ABS images 302, 304, and 306 from the frames of video. For example, the input generator may be onboard of a camera that includes the light-weight action classifier 160.

The system 300 may determine ABS images 302, 304, 306, etc. that are cumulatively generated based on two, three, and four consecutive frames of video (or some other numbers of frames), respectively. For example, the ABS images 302, 304, and 306 may be calculated by equations |Frame 2−Frame 1|, |Frame 2−Frame 1|+|Frame 3−Frame 2|, and |Frame 2−Frame 1|+|Frame 3−Frame 2|+|Frame 4−Frame 3|, respectively. A maximum number of frames in each ABS image may be determined based on hardware capabilities such as processing power or storage capacity of a server or a camera that includes the light-weight action classifier 160.

A minimum number of frames for each ABS image may be determined based on classification criteria such as a confidence score of a likely action output from the light-weight action classifier 160. For instance, the system 300 may determine an ABS image for a walking action from at least five frames if an ABS image of four frames is not sufficient to classify a walking action at a confidence score of 95%. Similarly, the system 300 may determine an ABS image for a running action from at least three frames if an ABS image of two frames is not sufficient to classify a running action at a confidence score of 95%.

In some implementations, the ABS images will be generated at multiple frame rates. For example, the ABS images may be generated with N images captured at 5 fps, 10 fps, and 25 fps. The light-weight action classifier 160 may output classification results with different confidence scores for the ABS images generated based on different frames rates. An optimum frame rate may be determined based on classification criteria such as a confidence score of a likely action output from the light-weight action classifier 160. For instance, the system 300 may determine an optimum frame rate at twenty five fps to generate an ABS image for a running action if an ABS image generated from images captured at ten fps is not sufficient to classify a running action at a confidence score of 95%. In some examples, the system 300 may generate an ABS image based on a single frame rate at a time. For example, the system 300 may generate a first ABS image based on images captured at ten fps and see a first confidence score 80% from the ABS image. The system 300 then may generate a second ABS image based on images captured at twenty five fps and see a second confidence score 95%. Based on comparing the first and second confidence scores, the system 300 may determine an optimum frame rate for an ABS image to twenty five fps which produced a higher confidence score.

In some implementations, the system 300 may generate the ABS images 302, 304, 306 based on a determination by the light-weight action classifier 160. For example, the system 300 may generate a subsequent ABS image if a prior ABS image did not satisfy classification criteria such as a confidence score (e.g., 95%). In the example shown in FIG. 3, the outputs 308 and 310 corresponding to the ABS images 302 and 304, respectively, do not satisfy the confidence score 95%, and the system 300 may generate an ABS image of more frames (e.g., ABS image 306) to process through the light-weight action classifier 160 until the system 300 achieves an output 312 that satisfies the confidence score 95%. In some cases, the system 300 may further process additional ABS images to generate an output 314 that exceeds the confidence score 95%. In other cases, the system 300 may stop generating a subsequent ABS image based on a prior ABS image having satisfied the confidence score 95%.

In some implementations, the light-weight action classifier 160 may process the ABS images 302, 304, 306 in series based on a determination by the light-weight action classifier 160. For instance, as described above, the light-weight action classifier 160 may process one ABS image at a time until achieving an output that satisfies a desired confidence score. In some implementations, the light-weight action classifier 160 may process the multiple ABS images 302, 304, 306 in parallel, and determine an ABS image that outputs the best confidence score. In some cases where the ABS image that outputs the best confidence score does not satisfy the desired confidence score, the light-weight action classifier 160 may further process additional ABS images that are generated from more frames of video than the prior ABS images 302, 304, 306.

In some implementations, the system 300 may determine a representation of an action such as metadata once the ABS image 306 satisfies a desired confidence score. In some cases, the system 300 may store the representation of the action and discard individual frames or the ABS images 302, 304, and 306 to reduce a usage rate of a storage space of the system 300. The system 300 may then move on to processing of next ABS images generated from more recent frames than the frames of the ABS image 302, 304, and 306.

Figure 4:
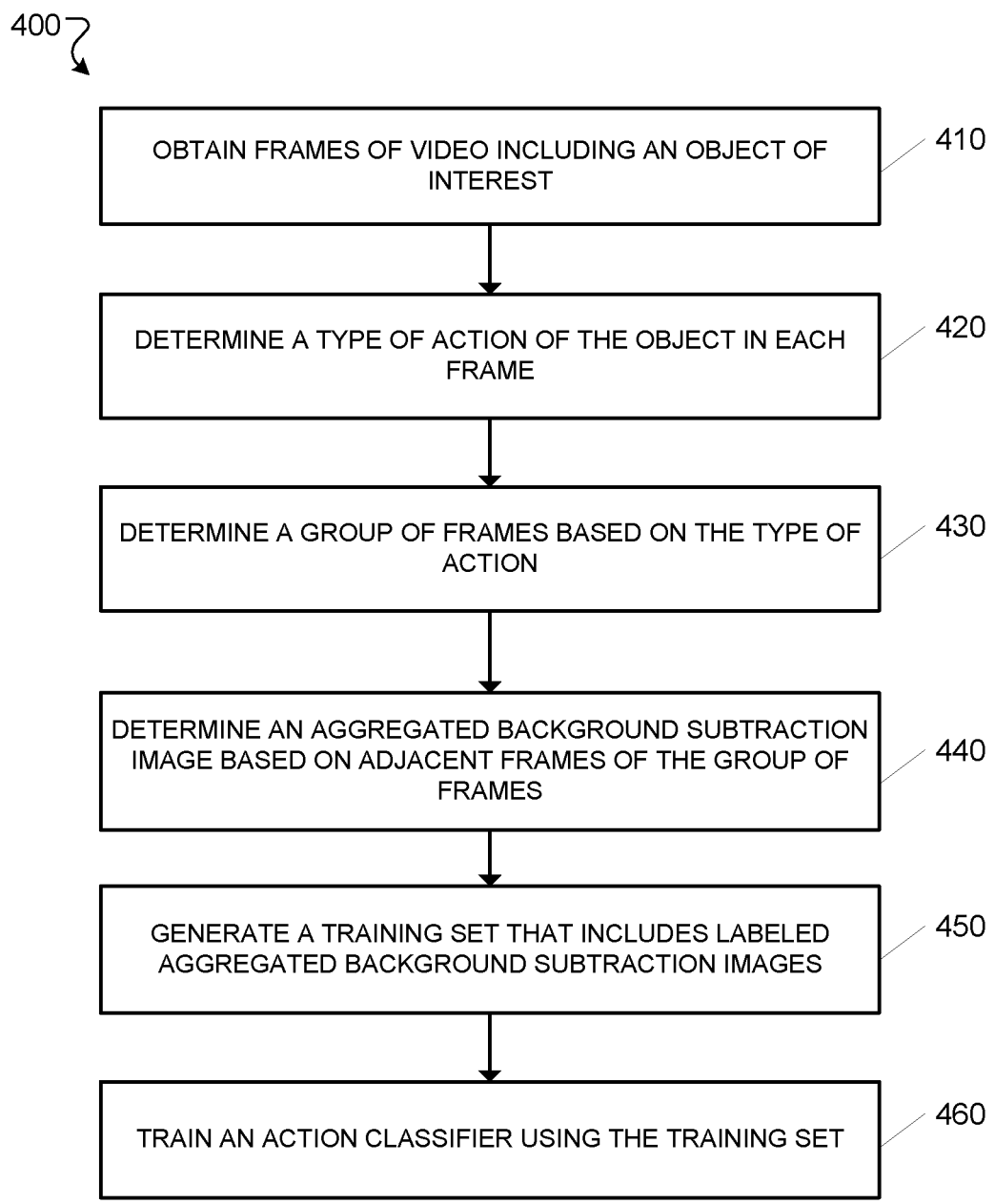
FIG. 4 is a flow diagram of an example process for training an action classifier.

FIG. 4 is a flow diagram of an example process 400 for training an action classifier. Process 400 can be implemented using system 100 described above. Thus, descriptions of Process 400 may reference one or more of the above-mentioned components, modules, or computational devices of system 100. In some implementations, described actions of Process 400 are enabled by computing logic or software instructions executable by a processor and memory of an example electronic device.

The process 400 includes obtaining frames of video including an object of interest (410). For example, a server may receive, from a camera, Frames 1-35 of video captured by the camera and provide the frames to the object detector 110 and the heavy-weight action classifier 130. For example, the object detector 110 may determine that Frames 1-15 and 31-35 include a human(s) and that Frames 16-30 do not include a human. In some implementations, the system 100 may obtain frames of video from an image repository that includes images of various objects and actions by the objects that were previously captured by the same camera or another camera and that are stored in the image repository.

The process 400 includes determining a type of action of the object in each frame (420). For example, the heavy-weight action classifier 130 may determine a type of action for each frame of Frames 1-15 and 31-35 that include one or more humans using a neural network that is configured to determine a type of action based on features detected from each frame of video. In some implementations, as described above, the heavy-weight action classifier 130 may determine a type of action by a human using locations and angles of joints of the human. In some implementations, determining a type of action of the object in each frame includes processing each of the frames of video through a heavy-weight action classifier that has a processing power greater than a processing power of the action classifier. For example, the processing power may include a number of operations that one or more processors of system 300 are able to perform in a unit time. In some implementations, processing each of the frames of video through the heavy-weight action classifier includes: determining locations of joints of the object with respect to a reference coordinate system; and determining the type of action of the object based on movement of the locations of the joints of the object.

The process 400 includes determining a group of frames from the frames of video based on the type of action (430). For example, the heavy-weight action classifier 130 may determine a first group of Frames 1-5 as a walk action group, a second group of Frames 6-10, a third group of Frames 11-15 as another walking action group, etc. Further, as described above, the heavy-weight action classifier 130 may determine a group of Frames 16-30 that do not include any action, and a group of Frames 31-35 that include multiple types of actions by multiple objects of interest.

The process 400 includes determining an aggregated background subtraction (ABS) image based on adjacent frames of the group of frames (440). For example, the training set generator 140 may determine an ABS image from a group of Frames 1-5, an ABS image from a group of Frames 6-10, an ABS image from a group of Frames 11-15, and an ABS image from a group of Frames 31-35. Each ABS image includes an absolute of inter-frame difference in a pixel level between a pair of adjacent frames as described above with respect to FIG. 2.

In some implementations, determining the ABS image includes: determining a first value of a pixel at a particular coordinate in a first frame among the group of frames; determining a second value of a pixel at the particular coordinate in a second frame adjacent to the first frame among the group of frames; obtaining an absolute value corresponding to a difference between the first value and the second value; aggregating the absolute value with one or more absolute values obtained for the particular coordinate from other pairs of frames among the group of frames; and based on the aggregation, determining a resulting value corresponding to a pixel in the ABS image that corresponds to the particular coordinate.

For example, the training set generator 140 may determine a first RGB value of a pixel at a particular coordinate in Frame 1, and a second RGB value of a pixel at the particular coordinate in Frame 2 that is adjacent to Frame 1 among the group of Frames 1-5. The training set generator 140 may obtain an absolute value corresponding to a difference between the first RGB value and the second RGB value and aggregate the absolute value with one or more absolute values obtained for the particular coordinate from other pairs of frames (e.g., Frames 2 and 3, Frames 3 and 4, and Frames 4 and 5) among the group of Frames 1-5. The training set generator 140 may, based on the aggregation, determine a resulting value corresponding to a pixel in the ABS image that corresponds to the particular coordinate. The training set generator 140 may perform similar operations for pixels at other coordinates in Frames 1-5 to generate the ABS image.

The process 400 includes generating a training set that includes aggregated background subtraction images (450). For example, the training set generator 140 may generate a training set for a walking action that includes ABS images generated from Frames 1-5 and Frames 11-15, respectively. In some implementations, the training set generator 140 may generate a training set that includes training samples for multiple types of actions such as Samples 1 and 3 for a walking action, Sample 2 for a running action, and Sample 4 for a combined action.

In some implementations, generating a training set that includes aggregated background subtraction images includes determining a label corresponding to the group of frames based on the type of action that was determined; and including the ABS image in the labeled ABS images labeled with the determined label. For example, the action classifier trainer 150 may store various previously labeled ABS images such as ABS images labeled with "Walking", ABS images labeled with "Running," and ABS images labeled with "Combined Action." The training set generator 140 may label Sample 1 with "Walking," and the action classifier trainer 150 may include Sample 1 in the stored ABS images labeled with "Walking" to update the training set with Sample 1.

The process 400 includes training an action classifier using the training set (460). For example, the action classifier trainer 150 may train an action classifier using a training set that includes Samples 1 and 3 that are labeled as a walking action and Sample 2 that is labeled as a running action. In some implementations, training an action classifier using the training set includes processing the training set through operation layers of the action classifier, where the operation layers include one or more parameters configured to classify the labeled ABS images to one or more types of actions; and based on classification results from the processing of the training set through the operation layers, updating the one or more parameters of the operation layers of the action classifier.

For instance, during training, the action classifier trainer 150 may determine operations and optimum parameters for the operations at one or more layers of a neural network (e.g., a shallow CNN) included in the light-weight action classifier 160. The light-weight action classifier 160 may update the optimum parameters based on classification results from the processing of the training set through the one or more layers of the neural network included in the light-weight action classifier 160.

Figure 5:
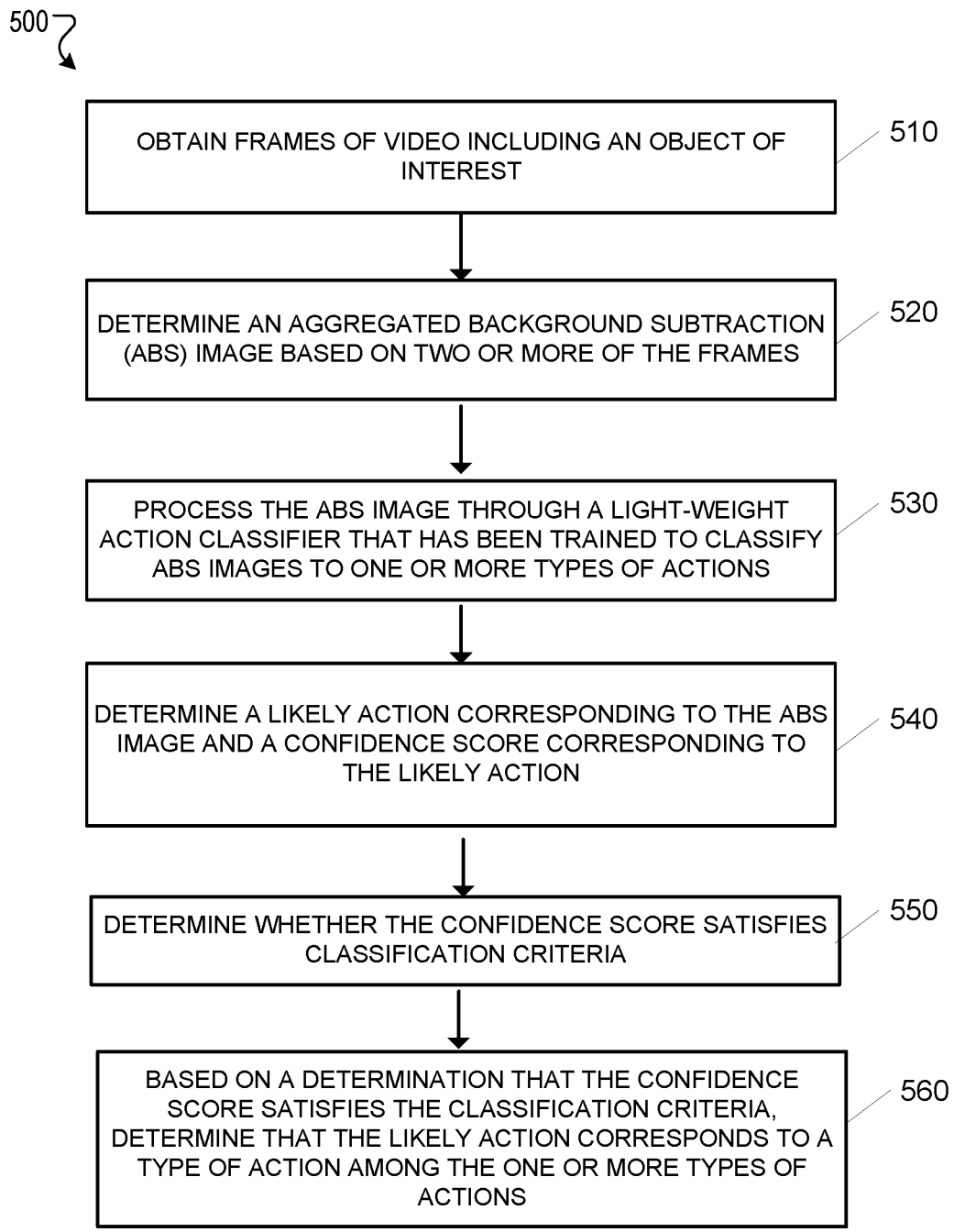
FIG. 5 is a flow diagram of an example process for classifying an action by an object of interest using a trained light-weight action classifier.

FIG. 5 is a flow diagram of an example process 500 for classifying an action by an object of interest using a trained light-weight action classifier. Process 500 can be implemented using or system 100, system 300, or both described above. Thus, descriptions of Process 500 may reference one or more of the above-mentioned components, modules, or computational devices of system 100 or system 300. In some implementations, described actions of Process 500 are enabled by computing logic or software instructions executable by a processor and memory of an example electronic device.

The process 500 includes obtaining frames of video including an object of interest (510). In some examples, obtaining frames of video including an object of interest includes obtaining sample frames of video including a sample object. The sample object may be the same as or different from the object of interest. For example, a camera may capture frames of video and provide the frames to the trained light-weight action classifier 160. In some examples, the camera may include the trained light-weight action classifier 160 on board, and transmit captured frames of video through a wire. In some examples, the camera may wirelessly communicate the frames of video to the light-weight action classifier 160.

The process 500 includes determining an aggregated background subtraction (ABS) image (520) based on two or more of the frames. In some examples, determining an aggregated background subtraction (ABS) image includes determining a sample ABS image based on two or more of the sample frames of video. For example, the system 300 may include an input generator that determines the ABS image. In some examples, the light-weight action classifier 160 may include the input generator. The system 300 may generate multiple ABS images based on two, three, four, five, or some other numbers of the frames. In some examples, the system 300 may generate multiple ABS images simultaneously. In other examples, the system 300 may generate one ABS image at a time based on classification results from the light-weight action classifier 160 with a prior ABS image.

The process 500 includes processing the ABS image through a light-weight action classifier that has been trained to classify ABS images to one or more types of actions (530). In some implementations, processing the ABS image through a light-weight action classifier that has been trained to classify ABS images to one or more types of actions includes processing the sample ABS image through the action classifier. For example, the light-weight action classifier 160 may include a CNN that includes one or more convolutional layers optimized with training samples (e.g., ABS images) corresponding to the one or more types of actions of an object. The light-weight action classifier 160 may be trained by a training process similar to the process 400 described above. The system 300 may input the ABS images 302, 304, and 306 to the trained light-weight action classifier 160, which processes the ABS images 302, 304, and 306 through one or more operations at the convolutional layers or some other layers of the CNN.

The process 500 includes determining a likely action corresponding to the ABS image and a confidence score corresponding to the likely action (540). In some implementations, determining a likely action corresponding to the ABS image and a confidence score corresponding to the likely action includes determining a type of action corresponding to the sample object among the one or more types of actions based on an output of the action classifier. For example, the light-weight action classifier 160 may determine a likely action corresponding to the ABS image among the one or more types of actions such as Walking, Running, Sitting, Bending, Opening a door, Falling, Diving, etc. that are known to the light-weight action classifier 160. In some implementations, convolutional layers of the light-weight action classifier 160 may perform one or more filtering operations to extract features of the input ABS image and feed-forward the features to a next layer to output a classification label according to the features that represent a likely action of the input.

In some implementations, determining the likely action corresponding to the ABS image and the confidence score corresponding to the likely action includes receiving from the action classifier an indication of a likely action corresponding to the sample ABS image and a confidence score corresponding to the likely action. For instance, referring to FIG. 3, the system 300 may receive, from the light-weight action classifier 160, an indication of a likely action such as Walking and Running corresponding to the ABS 1 and ABS 2, respectively. The light-weight action classifier 160 may further determine a confidence score corresponding to the determined likely action. For example, the light-weight action classifier 160 may determine an output 312 that indicates a Running action corresponding to the ABS image 306 and a confidence score 95% corresponding to the Running action. The system 300 may receive the determined confidence score corresponding to the likely action.

The process 500 includes determining whether the confidence score satisfies classification criteria (550). For example, the system 300 may compare the confidence score of the output 312 with a desired confidence score (e.g., 95%). In some examples, the classification criteria may further include a desired speed of classification to achieve the desired confidence score. In such examples, the system 300 may determine whether speeds of classification of the ABS images 302, 304, and 306 satisfy the desired speed of classification to achieve the desired confidence score ~95%.

The process 500 includes determining that the likely action corresponds to a type of action among the one or more types of actions based on a determination that the confidence score satisfies the classification criteria (560). For example, the system 300 may determine that a confidence score of the output 312 satisfies the desired confidence score 95% and, in response, determine that the likely action of the output 312 corresponds to a Running action among the one or more types of actions that have been learned through a training process such as the process 400 described above.

In some implementations, the process 500 may further include processing additional ABS images based on a determination that the confidence score does not satisfy the classification criteria. For example, the system 300 may process an additional ABS image generated from more frames than the ABS images that did not satisfy the classification criteria.

In some implementations, the process 500 may include: determining a first number of frames corresponding to the sample ABS image; comparing the confidence score to a threshold confidence score included in the classification criteria; and based on a result of the comparison, determining whether the first number of frames was a threshold number of frames that satisfies the classification criteria. For example, referring to FIG. 3, the system 300 may determine to process, through the light-weight action classifier, the ABS 2 that has been determined from three frames of video, and compare the confidence score of the ABS 2 to a threshold score (e.g., 95%). The system 300 may determine whether the three frames was a threshold number of frames that satisfies the classification criteria. In this example, the ABS 2 determined from the three frames resulted in the confidence score 70% less than the threshold score 95%, and thus the system 300 may determine that three frames were not a threshold number of frames that satisfies the classification criteria.

In some implementations, the process 500 may include, based on a determination that the first number of frames was not the threshold number of frames that satisfies the classification criteria, determining a subsequent sample ABS image from a second number of frames that is different from the first number of frames; and providing the subsequent sample ABS image to the action classifier. For instance, the system 300 may, based on the determination that the three frames were not a threshold number of frames that satisfies the classification criteria, determine ABS 3 from four frames of video. The system 300 may then provide the ABS 3 to the light-weight action classifier to obtain a confidence score corresponding to the ABS 3, and compare the confidence score corresponding to the ABS 3 to the threshold score. The system 300 may repeat a similar process until determining one number of frames as a threshold number of frames for generating an ABS image.

In some implementations, the process 500 may include processing a plurality of sample ABS images determined from different numbers of sample frames of video; determining a likely action corresponding to each of the plurality of sample ABS images and a confidence score corresponding to each likely action; comparing each confidence score to a threshold confidence score; and based on results of the comparison, determining one number of frames among the numbers of frames as a threshold number of frames for generating a subsequent ABS image. For example, the light-weight action classifier 160 may simultaneously process multiple sample ABS images (e.g., ABS 1, ABS 2, ABS 3, etc.) and determine a likely action (e.g., Walking, Running, etc.) corresponding to each of the multiple sample ABS image and a confidence score corresponding to each likely action. The system 300 may compare each confidence score (e.g., 10%, 70%, 95%, . . . , 99.5%) to a threshold score (e.g., 95%) and determine that four frames are a threshold number of frames for generating an ABS image that satisfies classification criteria.

In some cases, the threshold score may include a range of scores, for example, 90%-96%. For instance, the system 300 may, based on a determination that ABS N resulted in a confidence score (e.g., 99.5%) greater than an upper bound (i.e., 96%) of the range of scores, reduce the number of frames to generate an ABS image that satisfies classification criteria. In some examples, where the light-weight action classifier 160 simultaneously processes multiple sample ABS images, the system 300 may select a minimum number of frames that results in a confidence score within the range of scores.

In some implementations, the process 500 may include customizing one or more settings for ABS image generation based on a field of view of a camera. For example, customizing the one or more settings for ABS image generation may include building an occlusion map of a scene including regions where silhouettes consistently or intermittently disappear and then re-appear, building a scale map of the scene and determining average sizes of the silhouettes across time, and determining a number of frames to be used to generate an optimum ABS image based on a location(s) of the silhouettes.

In some implementations, the number of frames to be used to generate an optimum ABS image may be determined based on a scale of an object in one or more frames of video. The scale of the object may vary based on a distance from the camera and the object. For example, when the object is located far from the camera (e.g., a small size in the scale map), the optimum ABS image may be generated using more frames than when the object is located close to the camera (e.g., a large size in the scale map).

In some implementations, the number of frames to be used to generate an optimum ABS image may be determined based a distance between the object and an area with occlusion determined in the occlusion map. For example, the optimum ABS image may be generated using lesser frames as the object is nearing the area with occlusion. In some cases, using more frames as the object is nearing the area with occlusion may invariably involve an occluded frame(s), which may result in an ABS image with two disjoint segments.

In some implementations, determining the number of frames used for generating the ABS image is based on a context of a scene (e.g., an area monitored by a camera). In some examples, as the more number of frames are used to generate an ABS image, the ABS image may capture the better signature of the object (e.g., a type of action of the object, a type of the object, etc.). In some examples, the camera may present un-occluded or wider fields of view of the scene. In some other examples, the camera may present a constrained view of the scene in which the scene may be tight or narrow in space or there are one or more occluding objects (e.g., pillars, trees) in the scene. In some examples, where the camera presents the constrained view of the scene, the system may optimize (e.g., decrease or increase) the number of frames for ABS image generation to capture a signature of an event that is occurring in the scene. In some cases, the system may repeat the optimization until the ABS image captures the best possible signature of the event. For example, the system may determine that the ABS image does not capture a signature well, e.g., was generated with a frame where the object was occluded, and, in response, decrease the number of frames used and re-generate a new ABS, repeating as needed. In another example, the system may determine that the ABS image does not capture a signature well and, in response, include an additional frame and generate a new ABS image, repeating as needed.

In some examples where the classification criteria include a desired speed of classification to achieve a desired confidence score, the system 300 may determine to skip processing of one or more ABS images that repeatedly output confidence scores less than a desired confidence score to improve the speed of classification. For example, if the light-weight action classifier 160 provided an output 308 at a confidence score 10% or less for multiple times using an ABS image 302 generated from two consecutive frames, the system 300 may determine to skip generating or processing an ABS image 302 for future classification of an action by an object. By skipping unnecessary processes in classification of the action, the system 300 may achieve the desired confidence score at a faster speed of classification.

In some implementations, the light-weight action classifier 160 may be further trained while being used, for example, based on classification results with the ABS images 302, 304, 306, etc. after initially trained with a training set such as Samples 1-4. For example, a user may provide a validation input that indicates whether the light-weight action classifier 160 correctly classified the ABS images 302, 304, 306, etc. Based on the user's validation input on the classification results, the system 300 may adjust operations or parameters of the light-weight action classifier 160.

In some implementations, the light-weight action classifier 160 may identify unusual actions by an object (e.g. human), and the system 300 may provide an alert to a user of the system 300. For example, a camera that monitors a swimming pool may detect a running action of a human and provide an alert to a manager of the swimming pool. In another, a camera that monitors a driveway or a garage area of a property may detect a person falling on the driveway or a garage door being open and, in response, provide an alert to a user of the property.

In some implementations, the system 300 may determine a number of frames of video for an ABS image, which relates to a speed of classification, based on a risk level of an action or a scene corresponding to the action. For example, an action in a swinging pool may correspond to a higher risk level than an action at a drive way or backyard. In some cases, the system 300 may determine a frame rate of the video or a number of ABS images to increase the speed of classification of an action corresponding to a high risk level.

In some examples, the system 300 may, using image recognition techniques, determine a scene to determine a risk level of the scene among other scenes corresponding to different predetermined risk levels, respectively. For example, when the system 300 recognizes a swimming pool in an image or video, the system 300 may determine a risk level of an action that is associated with the swimming pool scene among multiple risk levels associated with other different scenes. For instance, a risk level of a swimming pool may be set to ten in a one to ten scale while a risk level of a backyard may be set to one in the one to ten scale. Based on a determination of the risk level associated with the swimming pool scene from the image or video, the system 300 may determine to use a shorter frame window or a faster frame rate to generate an ABS image. In some examples, a user may set a risk level for each camera that monitors a certain area of a monitored property, or simply set a frame rate for each camera. In such cases, each camera may be preset to capture a video with a certain frame window based on the monitored area.

In some implementations, the light-weight action classifier 160 may be trained to classify an ABS image that includes various types of objects other than a human. For instance, the light-weight action classifier 160 may be trained to classify moving vehicles based on their speeds to detect speeding events in which slow or stationary vehicles may be excluded from the ABS images. In some cases, the light-weight action classifier 160 may be trained to classify actions by pet animals. In some implementations, the light-weight action classifier 160 may be trained to ignore actions by objects that are not of importance. For example, the light-weight action classifier 160 may be trained to ignore movements of an automated vacuum cleaner, pool cleaner, or floating objects in the pool. In some cases, the light-weight action classifier 160 may detect actions by the objects that are not of importance, but the system 300 may be configured not to alert a user of the system 300 of such a detection.

In some examples, the system 300 may determine occurrence of an action that is expected or scheduled to run at a certain time occurs based the light-weight action classifier 160. In some cases, the system 300 may notify a user if the expected action did not occur at the certain time. For instance, the system 300 may include a running schedule of an automated vacuum cleaner that is expected to run at 3 P.M. every day. If the light-weight action classifier 160 does not detect, using the ABS image, the expected action of the automated vacuum cleaner within a time window around 3 P.M., the system 300 may send a text message to a user.

In some implementations, the light-weight action classifier 160 may identify, using the ABS image, an object such as a door, trashcans, lawnmowers, etc. For example, the light-weight action classifier 160 identify an object that is moving at the same velocity (i.e., the same speed and the same direction) as a person, which it is likely that the person is interacting with the object. In some cases, such object may be eliminated from further analysis if the object is of no interest. For example, the system 300 may ignore moving branches, cars located on the street, or shadows, etc.

Customizing the ABS image generation settings based on the camera's field of view. Three steps get us there:
Build an occlusion map of the scene: Regions where silhouettes consistently disappear and then re-appear
Build a scale map of the scene: Average sizes of silhouettes across time
Determining the number of frames to use to generate the best ABS image based on silhouette's location.
When the object is too far away (small in scale), use more frames to generate the ABS image than when the object is very close to the camera (large in scale)
When the object is nearing an area with occlusion, use lesser frames to the generate the ABS image as using more frames will invariably involve the occluded frame and thereby an ABS image with two disjoint segments
General idea is: Determining the number of frames used for generating the ABS image based on the scene's context: In general, the more the number of frames that we use to generate the aggregate background subtraction image, the better the signature we capture. While in certain scenes, the camera present un-occluded wider fields of view of the scene, in some other scenes the camera can present a much more constrained view of the scene whereby either the scene is tight in space or there are many occluding objects (pillars, trees) in the scene. In such scenes, the system could optimize on the number of frames it waits for the ABS signature generation in order to get the best possible signature of the event.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining frames of video including an object of interest;
determining a type of action of the object in each of the frames of video;
determining a group of frames from the frames of video based on the type of action;
determining an aggregated background subtraction (ABS) image based on adjacent frames of the group of frames;
generating a training set that includes labeled ABS images including the ABS image;
training an action classifier using the training set;
obtaining sample frames of video including a sample object;
determining a sample ABS image based on two or more of the sample frames of video;
processing the sample ABS image through the action classifier; and
determining a type of action corresponding to the sample object among the one or more types of actions based on an output of the action classifier.

2. The method of claim 1, wherein determining the ABS image comprises:
determining a first value of a pixel at a particular coordinate in a first frame among the group of frames;
determining a second value of a pixel at the particular coordinate in a second frame adjacent to the first frame among the group of frames;
obtaining an absolute value corresponding to a difference between the first value and the second value;
aggregating the absolute value with one or more absolute values obtained for the particular coordinate from other pairs of frames among the group of frames; and
based on the aggregation, determining a resulting value corresponding to a pixel in the ABS image that corresponds to the particular coordinate.

3. The method of claim 1, wherein determining the type of action corresponding to the sample object based on an output of the action classifier comprises:
receiving from the action classifier an indication of a likely action corresponding to the sample ABS image and a confidence score corresponding to the likely action;
determining whether the confidence score satisfies classification criteria; and
based on a determination that the confidence score satisfies the classification criteria, determining that the likely action corresponds to the type of action among the one or more types of actions.

4. The method of claim 3, comprising:
determining a first number of frames corresponding to the sample ABS image;
comparing the confidence score to a threshold confidence score included in the classification criteria; and
based on a result of the comparison, determining whether the first number of frames was a threshold number of frames that satisfies the classification criteria.

5. The method of claim 4, comprising:
based on a determination that the first number of frames was not the threshold number of frames that satisfies the classification criteria, determining a subsequent sample ABS image from a second number of frames that is different from the first number of frames; and
providing the subsequent sample ABS image to the action classifier.

6. The method of claim 1, wherein processing the sample ABS image through the action classifier comprises:
processing a plurality of sample ABS images determined from different numbers of sample frames of video, and wherein the method comprises:
determining a likely action corresponding to each of the plurality of sample ABS images and a confidence score corresponding to each likely action;
comparing each confidence score to a threshold confidence score; and
based on results of the comparison, determining one number of frames among the numbers of frames as a threshold number of frames for generating a subsequent ABS image.

7. The method of claim 1, wherein determining the type of action of the object in each of the frames of video comprises:
processing each of the frames of video through a heavy-weight action classifier that has a processing power greater than a processing power of the action classifier.

8. The method of claim 7, wherein processing each of the frames of video through the heavy-weight action classifier comprises:
determining locations of joints of the object with respect to a reference coordinate system; and
determining the type of action of the object based on movement of the locations of the joints of the object.

9. The method of claim 1, comprising:
determining a label corresponding to the group of frames based on the type of action that was determined; and
including the ABS image in the labeled ABS images labeled with the determined label.

10. The method of claim 1, wherein training the action classifier comprises:
processing the training set through operation layers of the action classifier, the operation layers comprising one or more parameters configured to classify the labeled ABS images to one or more types of actions; and
based on classification results from the processing of the training set through the operation layers, updating the one or more parameters of the operation layers of the action classifier.

11. A system for action classification using images, the system comprising:
a camera configured to capture one or more images; and
at least one processor configured to perform operations comprising:
obtaining frames of video including an object of interest;
determining a type of action of the object in each of the frames of video;
determining a group of frames from the frames of video based on the type of action;
determining an aggregated background subtraction (ABS) image based on adjacent frames of the group of frames;
generating a training set that includes labeled ABS images including the ABS image;
training an action classifier using the training set;
obtaining sample frames of video including a sample object;
determining a sample ABS image based on two or more of the sample frames of video;

processing the sample ABS image through the action classifier; and determining a type of action corresponding to the sample object among the one or more types of actions based on an output of the action classifier.

12. The system of claim 11, wherein determining the ABS image comprises:

determining a first value of a pixel at a particular coordinate in a first frame among the group of frames;

determining a second value of a pixel at the particular coordinate in a second frame adjacent to the first frame among the group of frames;

obtaining an absolute value corresponding to a difference between the first value and the second value;

aggregating the absolute value with one or more absolute values obtained for the particular coordinate from other pairs of frames among the group of frames; and based on the aggregation, determining a resulting value corresponding to a pixel in the ABS image that corresponds to the particular coordinate.

13. The system of claim 11, wherein determining the type of action corresponding to the sample object based on an output of the action classifier comprises:

receiving from the action classifier an indication of a likely action corresponding to the sample ABS image and a confidence score corresponding to the likely action;

determining whether the confidence score satisfies classification criteria; and based on a determination that the confidence score satisfies the classification criteria, determining that the likely action corresponds to the type of action among the one or more types of actions.

14. The system of claim 13, wherein the operations comprise:

determining a first number of frames corresponding to the sample ABS image;

comparing the confidence score to a threshold confidence score included in the classification criteria; and based on a result of the comparison, determining whether the first number of frames was a threshold number of frames that satisfies the classification criteria.

15. At least one non-transitory computer-readable storage medium having stored thereon instructions which, when executed by at least one processor, cause performance of operations comprising:

obtaining frames of video including an object of interest;

determining a type of action of the object in each of the frames of video;

determining a group of frames from the frames of video based on the type of action;

determining an aggregated background subtraction (ABS) image based on adjacent frames of the group of frames;

generating a training set that includes labeled ABS images including the ABS image;

training an action classifier using the training set;

obtaining sample frames of video including a sample object;

determining a sample ABS image based on two or more of the sample frames of video;

processing the sample ABS image through the action classifier; and determining a type of action corresponding to the sample object among the one or more types of actions based on an output of the action classifier.

16. The storage medium of claim 15, wherein determining the ABS image comprises:

determining a first value of a pixel at a particular coordinate in a first frame among the group of frames;

determining a second value of a pixel at the particular coordinate in a second frame adjacent to the first frame among the group of frames;

obtaining an absolute value corresponding to a difference between the first value and the second value;

aggregating the absolute value with one or more absolute values obtained for the particular coordinate from other pairs of frames among the group of frames; and based on the aggregation, determining a resulting value corresponding to a pixel in the ABS image that corresponds to the particular coordinate.

17. The storage medium of claim 15, wherein determining the type of action corresponding to the sample object based on an output of the action classifier comprises:

receiving from the action classifier an indication of a likely action corresponding to the sample ABS image and a confidence score corresponding to the likely action;

determining whether the confidence score satisfies classification criteria; and based on a determination that the confidence score satisfies the classification criteria, determining that the likely action corresponds to the type of action among the one or more types of actions.

18. A computer-implemented method comprising:

obtaining frames of video including an object of interest;

determining a type of action of the object in each of the frames of video;

determining a group of frames from the frames of video based on the type of action;

determining an aggregated background subtraction (ABS) image based on adjacent frames of the group of frames;

generating a training set that includes labeled ABS images including the ABS image; and training an action classifier using the training set, wherein determining the ABS image comprises:

determining a first value of a pixel at a particular coordinate in a first frame among the group of frames, determining a second value of a pixel at the particular coordinate in a second frame adjacent to the first frame among the group of frames, obtaining an absolute value corresponding to a difference between the first value and the second value, aggregating the absolute value with one or more absolute values obtained for the particular coordinate from other pairs of frames among the group of frames, and based on the aggregation, determining a resulting value corresponding to a pixel in the ABS image that corresponds to the particular coordinate.

19. A system for action classification using images, the system comprising:

a camera configured to capture one or more images; and at least one processor configured to perform operations comprising:

obtaining frames of video including an object of interest;

determining a type of action of the object in each of the frames of video;

determining a group of frames from the frames of video based on the type of action;

determining an aggregated background subtraction (ABS) image based on adjacent frames of the group of frames;

generating a training set that includes labeled ABS images including the ABS image; and training an action classifier using the training set, wherein determining the ABS image comprises:

determining a first value of a pixel at a particular coordinate in a first frame among the group of frames, determining a second value of a pixel at the particular coordinate in a second frame adjacent to the first frame among the group of frames, obtaining an absolute value corresponding to a difference between the first value and the second value, aggregating the absolute value with one or more absolute values obtained for the particular coordinate from other pairs of frames among the group of frames, and based on the aggregation, determining a resulting value corresponding to a pixel in the ABS image that corresponds to the particular coordinate.

20. At least one non-transitory computer-readable storage medium having stored thereon instructions which, when executed by at least one processor, cause performance of operations comprising:

obtaining frames of video including an object of interest;

determining a type of action of the object in each of the frames of video;

determining a group of frames from the frames of video based on the type of action;

determining an aggregated background subtraction (ABS) image based on adjacent frames of the group of frames;

generating a training set that includes labeled ABS images including the ABS image; and training an action classifier using the training set, wherein determining the ABS image comprises:

determining a first value of a pixel at a particular coordinate in a first frame among the group of frames, determining a second value of a pixel at the particular coordinate in a second frame adjacent to the first frame among the group of frames, obtaining an absolute value corresponding to a difference between the first value and the second value, aggregating the absolute value with one or more absolute values obtained for the particular coordinate from other pairs of frames among the group of frames, and based on the aggregation, determining a resulting value corresponding to a pixel in the ABS image that corresponds to the particular coordinate.

21. A computer-implemented method comprising:

obtaining frames of video including an object of interest;

determining a type of action of the object in each of the frames of video;

determining a group of frames from the frames of video based on the type of action;

determining an aggregated background subtraction (ABS) image based on adjacent frames of the group of frames;

generating a training set that includes labeled ABS images including the ABS image; and training an action classifier using the training set, wherein training the action classifier comprises:

processing the training set through operation layers of the action classifier, the operation layers comprising one or more parameters configured to classify the labeled ABS images to one or more types of actions; and based on classification results from the processing of the training set through the operation layers, updating the one or more parameters of the operation layers of the action classifier.

22. A system for action classification using images, the system comprising:

a camera configured to capture one or more images; and at least one processor configured to perform operations comprising:

obtaining frames of video including an object of interest;

determining a type of action of the object in each of the frames of video;

determining a group of frames from the frames of video based on the type of action;

determining an aggregated background subtraction (ABS) image based on adjacent frames of the group of frames;

generating a training set that includes labeled ABS images including the ABS image; and training an action classifier using the training set, wherein training the action classifier comprises:

processing the training set through operation layers of the action classifier, the operation layers comprising one or more parameters configured to classify the labeled ABS images to one or more types of actions, and based on classification results from the processing of the training set through the operation layers, updating the one or more parameters of the operation layers of the action classifier.

23. At least one non-transitory computer-readable storage medium having stored thereon instructions which, when executed by at least one processor, cause performance of operations comprising:

obtaining frames of video including an object of interest;

determining a type of action of the object in each of the frames of video;

determining a group of frames from the frames of video based on the type of action;

determining an aggregated background subtraction (ABS) image based on adjacent frames of the group of frames;

generating a training set that includes labeled ABS images including the ABS image; and training an action classifier using the training set, wherein training the action classifier comprises:

processing the training set through operation layers of the action classifier, the operation layers comprising one or more parameters configured to classify the labeled ABS images to one or more types of actions, and based on classification results from the processing of the training set through the operation layers, updating the one or more parameters of the operation layers of the action classifier.

* * * * *